United States Patent
Oda et al.

(10) Patent No.: US 9,917,639 B2
(45) Date of Patent: Mar. 13, 2018

(54) OPTICAL SIGNAL QUALITY MONITORING APPARATUS, OPTICAL SIGNAL QUALITY MONITORING METHOD AND OPTICAL REPEATER

(71) Applicant: FUJITSU LIMITED, Kawasaki-shi, Kanagawa (JP)

(72) Inventors: Shoichiro Oda, Fuchu (JP); Yasuhiko Aoki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 77 days.

(21) Appl. No.: 14/971,225

(22) Filed: Dec. 16, 2015

(65) Prior Publication Data

US 2016/0226580 A1    Aug. 4, 2016

(30) Foreign Application Priority Data

Jan. 30, 2015    (JP) .................................. 2015-017316

(51) Int. Cl.
    *H04B 10/079*    (2013.01)
(52) U.S. Cl.
    CPC ............................. *H04B 10/07953* (2013.01)
(58) Field of Classification Search
    CPC .............................................. H04B 10/07953
    See application file for complete search history.

(56) References Cited

U.S. PATENT DOCUMENTS

| | | | | |
|---|---|---|---|---|
| 6,433,864 B1 * | 8/2002 | Chung | .................. | H04B 10/077 356/73.1 |
| 6,952,529 B1 * | 10/2005 | Mittal | .............. | H04B 10/07953 398/25 |
| 2014/0219666 A1 * | 8/2014 | Tselniker | .......... | H04L 25/03019 398/208 |
| 2014/0270756 A1 * | 9/2014 | Oda | .................... | H04B 10/0791 398/26 |
| 2015/0155935 A1 * | 6/2015 | Oda | ................. | H04B 10/07953 398/26 |
| 2015/0330835 A1 * | 11/2015 | Yamauchi | ................. | G01J 1/44 250/214 C |
| 2015/0333825 A1 * | 11/2015 | Kim | ................. | H04B 10/07953 398/26 |
| 2016/0006515 A1 * | 1/2016 | Kojima | ................ | H04B 10/508 398/193 |
| 2017/0033866 A1 * | 2/2017 | Wang | ................... | H04B 10/077 |

FOREIGN PATENT DOCUMENTS

JP        2009-244163        10/2009

* cited by examiner

*Primary Examiner* — Nathan Cors
(74) *Attorney, Agent, or Firm* — Staas & Halsey LLP

(57) ABSTRACT

An optical signal quality monitoring apparatus includes: a holding unit configured to hold a relational expression representing a relationship among an optical signal intensity, a noise intensity, and an optical signal-to-noise ratio and a plurality of calibration coefficients used in the relational expression; a measurement unit configured to measure an optical power of input light and a noise power in the input light; an arithmetic unit configured to calculate a plurality of optical signal-to-noise ratios, based on the optical power and the noise power measured by the measurement unit, by using the relational expression and the plurality of calibration coefficients; and a determination unit configured to select one optical signal-to-noise ratio from the plurality of optical signal-to-noise ratios, based on a magnitude relationship of the plurality of optical signal-to-noise ratios calculated by the arithmetic unit.

14 Claims, 13 Drawing Sheets

FIG. 6A
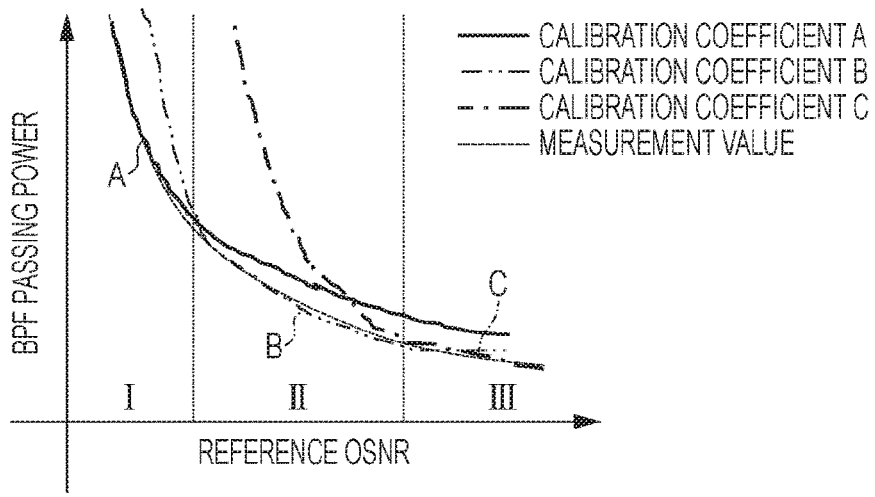
FIG. 6B
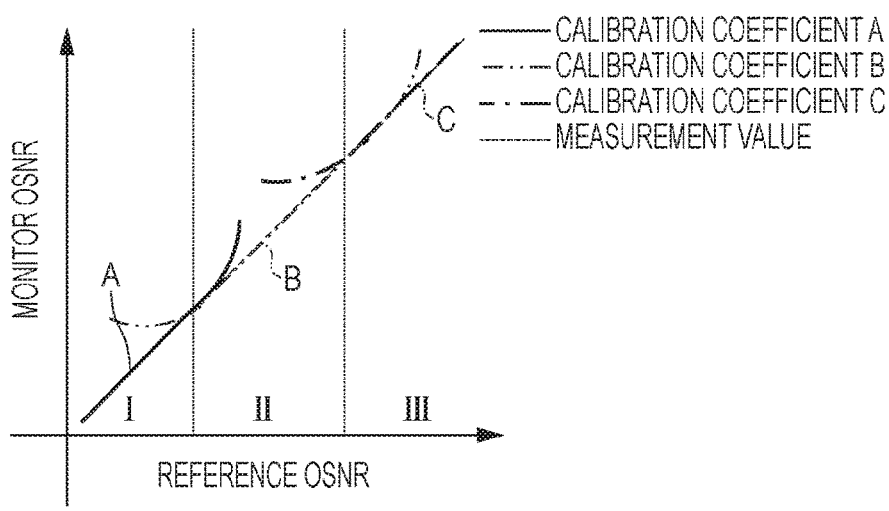
FIG. 6C
MAGNITUDE RELATIONSHIP TABLE
| AREA I | $OSNR_A < OSNR_B < OSNR_C$ |
|---|---|
| AREA II | $OSNR_B < OSNR_A < OSNR_C$ |
| | $OSNR_B < OSNR_C < OSNR_A$ |
| AREA III | $OSNR_C < OSNR_B < OSNR_A$ |

FIG. 7A
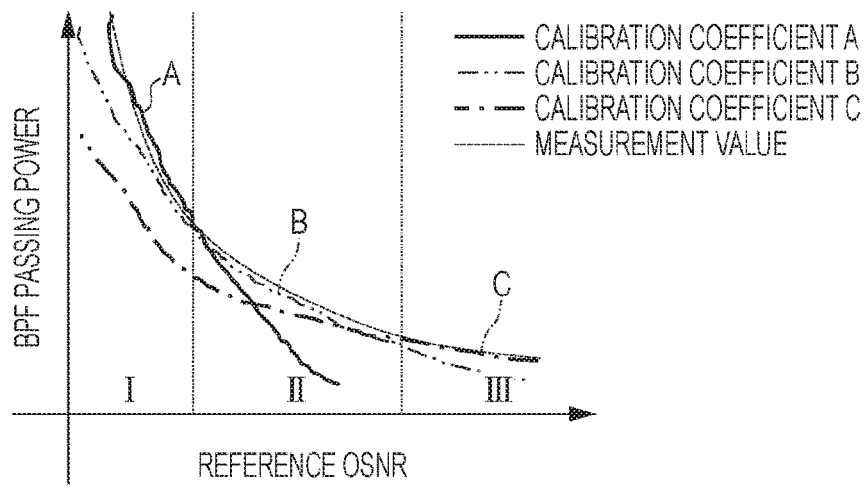
FIG. 7B
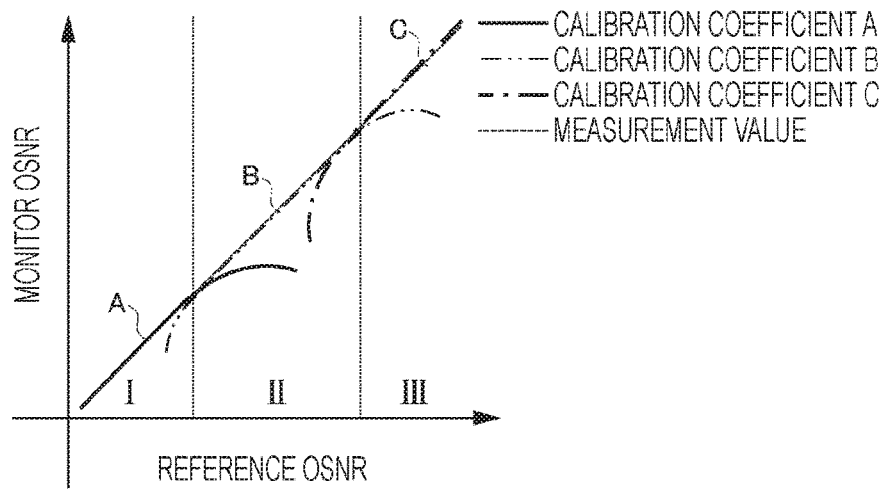
FIG. 7C
MAGNITUDE RELATIONSHIP TABLE
AREA I     $OSNR_C < OSNR_B < OSNR_A$
AREA II     $OSNR_C < OSNR_A < OSNR_B$
               $OSNR_A < OSNR_C < OSNR_B$
AREA III     $OSNR_A < OSNR_B < OSNR_C$ FIG. 9A
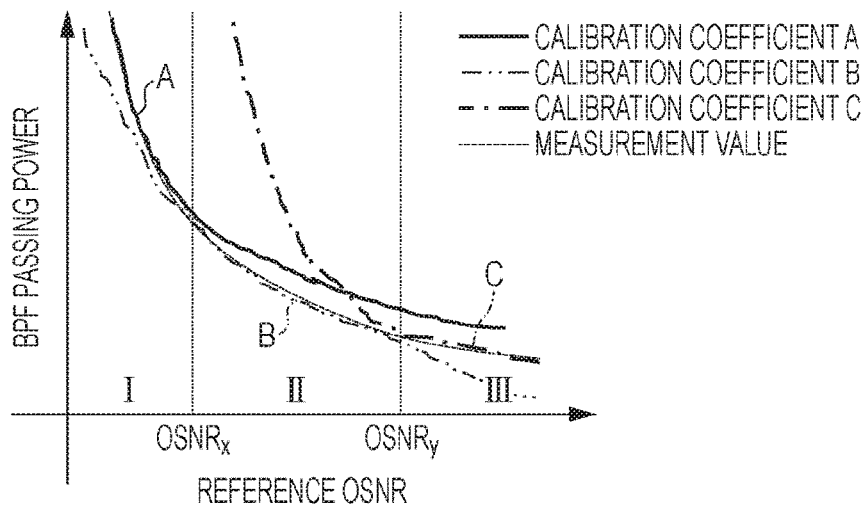
FIG. 9B
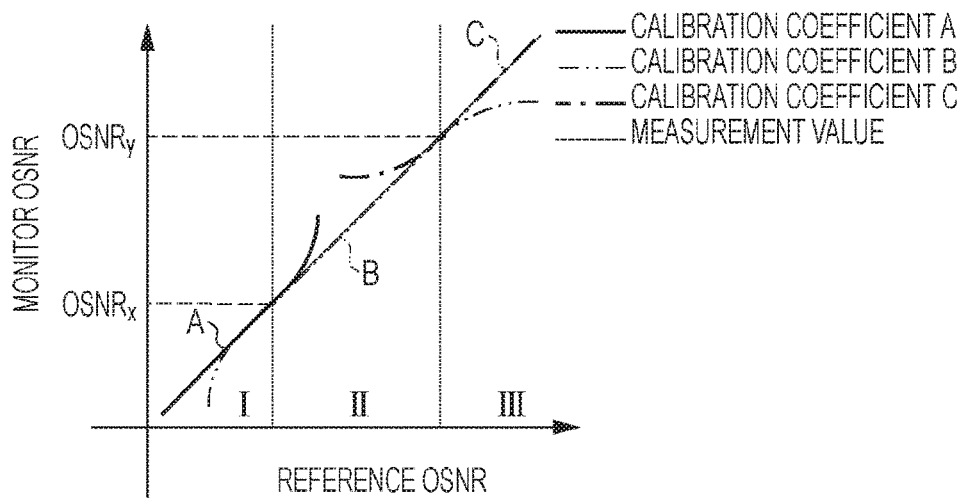
FIG. 9C
MAGNITUDE RELATIONSHIP TABLE
| | | |
|---|---|---|
| AREA I | $OSNR_B < OSNR_A < OSNR_C$ | $OSNR_B < OSNR_x$ |
| AREA II | $OSNR_B < OSNR_A < OSNR_C$ | $OSNR_x \leq OSNR_B \leq OSNR_y$ |
| | $OSNR_B < OSNR_C < OSNR_A$ | $OSNR_x \leq OSNR_B \leq OSNR_y$ |
| AREA III | $OSNR_B < OSNR_C < OSNR_A$ | $OSNR_y < OSNR_B$ |
ADDITIONAL AREA INFORMATION

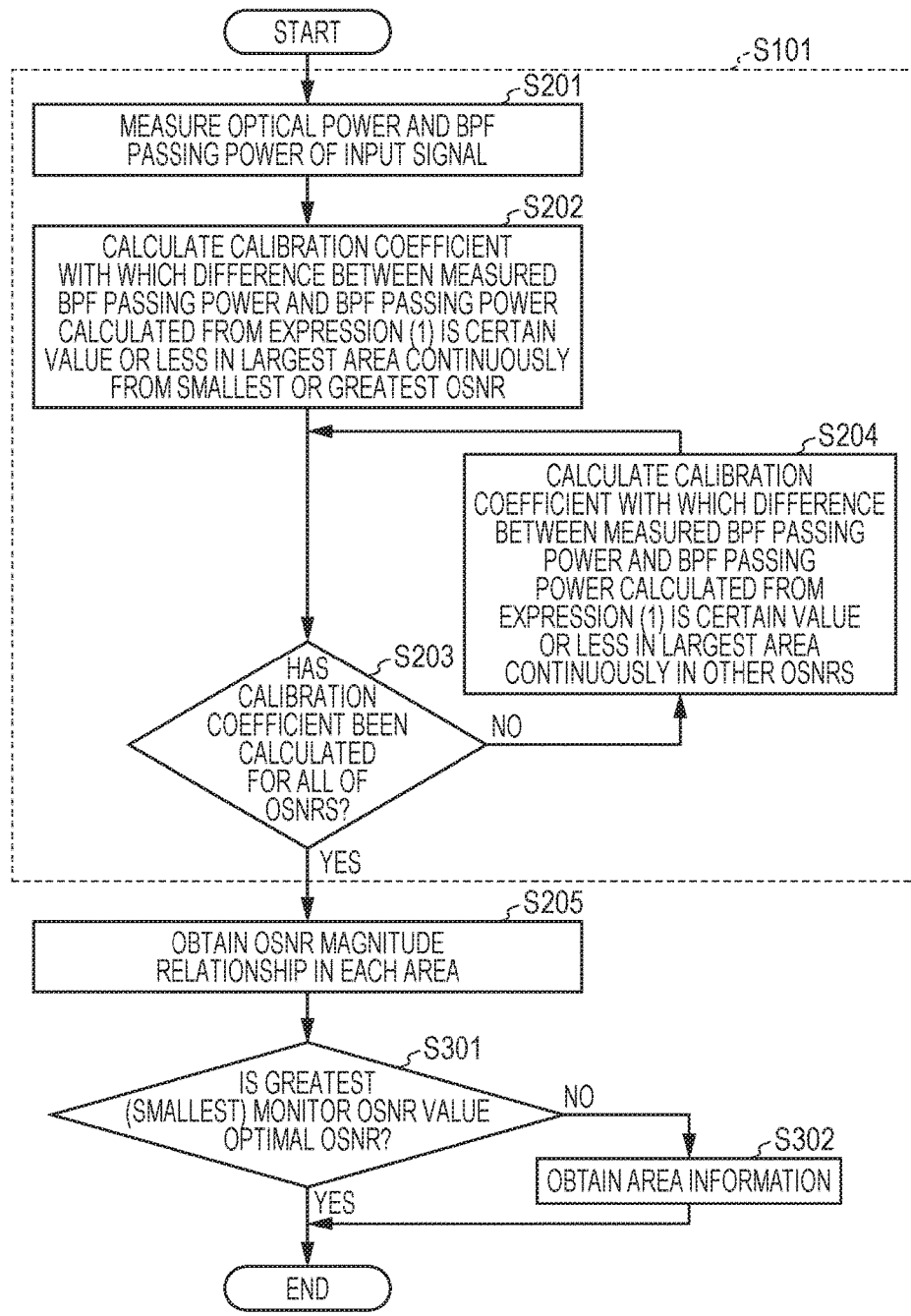

OPTICAL SIGNAL QUALITY MONITORING APPARATUS, OPTICAL SIGNAL QUALITY MONITORING METHOD AND OPTICAL REPEATER

CROSS-REFERENCE TO RELATED APPLICATION

This application is based upon and claims the benefit of priority of the prior Japanese Patent Application No. 2015-017316, filed on Jan. 30, 2015, the entire contents of which are incorporated herein by reference.

FIELD

The embodiment discussed herein is related to an optical signal quality monitoring technique.

BACKGROUND

In an optical transmission network via which a wavelength division multiplex (WDM) signal is transmitted, an optical signal-to-noise ratio (OSNR) is monitored and an optical device provided on an optical network is controlled such that the OSNR of a certain value or more may be achieved. Also, an error and a failure of an optical transmission path and an optical transmission apparatus may be detected by monitoring the OSNR. It is anticipated that, in next-generation optical networks, the wavelength and route of an optical signal will dynamically change and that there will be an increased demand for optical signal quality monitoring in the future.

As an OSNR monitoring method, a method in which received an optical signal is caused to branch out into two paths, an optical power is measured on one of the paths, a noise power $N_{beat}$ is measured on the other one of the paths, and an optical signal power $P_{sig}$ is obtained and an OSNR is calculated from Expression (1) has been known (for example, see U.S. Pat. No. 6,433,864).

$$N_{beat} = 2\frac{A}{R}P_{sig}^2\left(\frac{1}{OSNR} + \frac{B_O}{2R \cdot OSNR^2}\right) \quad (1)$$

In Expression (1), R is a measured resolution, $B_O$ is a bandwidth of an optical signal, and A is a constant.

SUMMARY

According to an aspect of the invention, an optical signal quality monitoring apparatus includes: a holding unit configured to hold a relational expression representing a relationship among an optical signal intensity, a noise intensity, and an optical signal-to-noise ratio and a plurality of calibration coefficients used in the relational expression; a measurement unit configured to measure an optical power of input light and a noise power in the input light; an arithmetic unit configured to calculate a plurality of optical signal-to-noise ratios, based on the optical power and the noise power measured by the measurement unit, by using the relational expression and the plurality of calibration coefficients; and a determination unit configured to select one optical signal-to-noise ratio from the plurality of optical signal-to-noise ratios, based on a magnitude relationship of the plurality of optical signal-to-noise ratios calculated by the arithmetic unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A to 6C are graphs and a table illustrating an example of optimization in which the smallest value among a plurality of OSNR values is the most optimal OSNR value;

FIGS. 7A to 7C are graphs and a table illustrating an example of optimization in which the largest value among a plurality of OSNR values is the most optimal OSNR value;

FIGS. 9A to 9C are graphs and a table illustrating an example where area information is added to the magnitude relationship table;

FIG. 10 is a flow chart of processing of obtaining a magnitude relationship table of FIG. 9C;

DESCRIPTION OF EMBODIMENT

The present inventors found that, when an OSNR is calculated using a fixed constant or a set of fixed constants in a relational expression representing a relationship among a signal power, a noise power, and the OSNR, an error occurs between a calculated OSNR and an actual OSNR depending on a monitoring range.

Before describing an embodiment, a technical problem that the present inventors found will be described with reference to FIGS. 1A to 1B and FIGS. 2A to 2B. When an OSNR is calculated from an expression, that is, for example, Expression (1), which represents a relationship among an optical signal power ($P_{sig}$), a noise power ($N_{beat}$), and the OSNR, it is desirable to properly determine a constant A. In order to highly accurately measure the OSNR over a wide range, it is desirable to determine an optimal constant A for each of various combinations of $P_{sig}$ and $N_{beat}$. However, a problem in which the number of measurement steps, that is, a cost, is increased arises, and therefore, the range of $P_{sig}$ is narrowed down to a certain range, and one constant A is determined and is thus used. In this case, a large monitor error occurs.

Figure 1A:
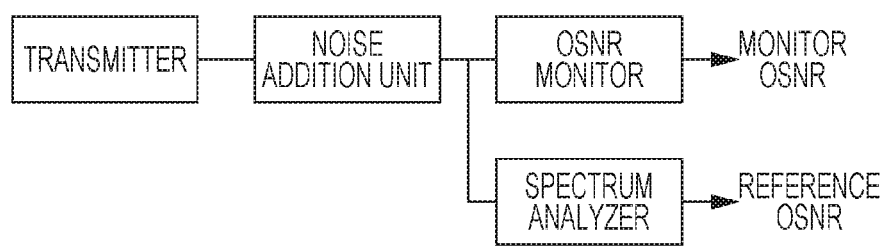
FIGS. 1A and 1B are a diagram and a graph illustrating a problem that arises in an OSNR monitoring method which has been conventionally used.

FIGS. 1A to 1B and FIGS. 2A to 2B are diagrams and graphs illustrating OSNR monitor errors. In order to check whether or not a monitor value obtained in a general OSNR monitoring apparatus matches with an actual OSNR, a test apparatus of FIG. 1A is assembled. After an optical signal output from a transmitter is input to a noise addition unit and is adjusted to a desired OSNR, the optical signal is input to an OSNR monitor and an optical spectrum analyzer. An OSNR obtained from the optical spectrum analyzer is the actual OSNR. The OSNR is referred to as the "reference OSNR". On the other hand, an OSNR calculated from Expression (1) using measurement values of the noise power and the optical power is output from the OSNR monitor. The calculated OSNR is referred to as the "monitor OSNR".

Figure 1B:
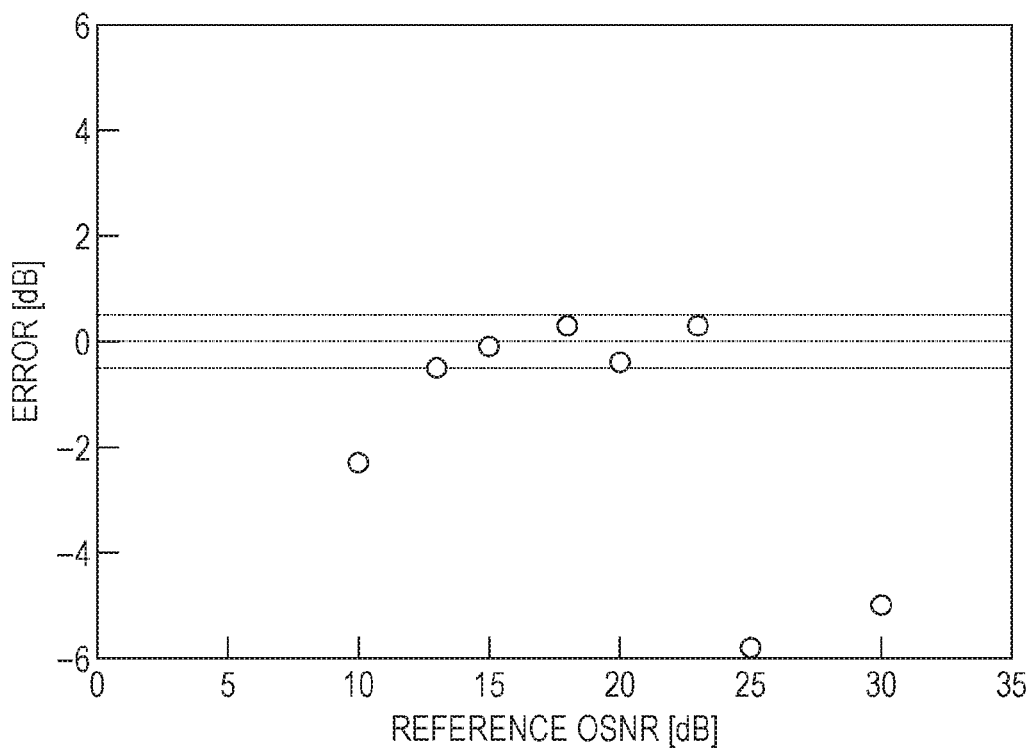

FIG. 1B is a graph in which monitor errors are plotted, based on the reference OSNR and the monitor OSNR obtained in the test apparatus of FIG. 1A. Each monitor error is represented by a difference between the reference OSNR and the calculated monitor OSNR. For example, it is understood that, assuming that ±0.5 dB is an allowable error, a large monitor error has occurred in each of an area in which the reference OSNR is 10 dB to 15 dB and an area in which the reference OSNR is 25 dB to 30 dB.

Figure 2A:
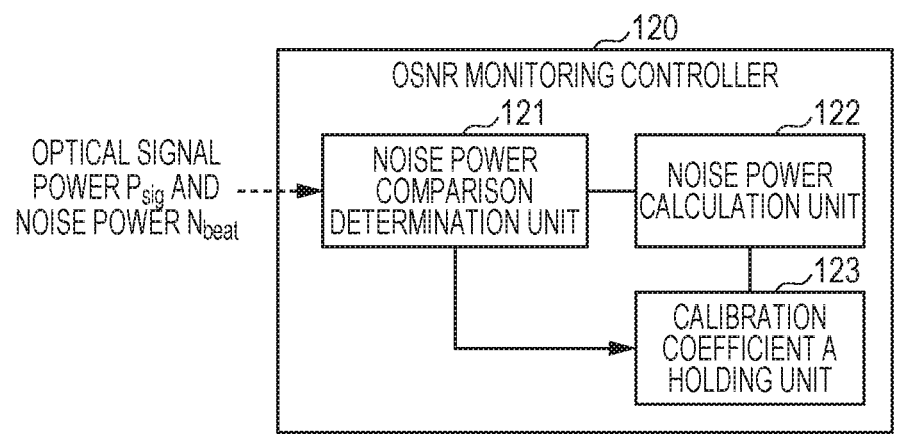
FIGS. 2A and 2B are a diagram and a graph illustrating a problem that arises in an OSNR monitoring method which has been conventionally used.
Figure 2B:
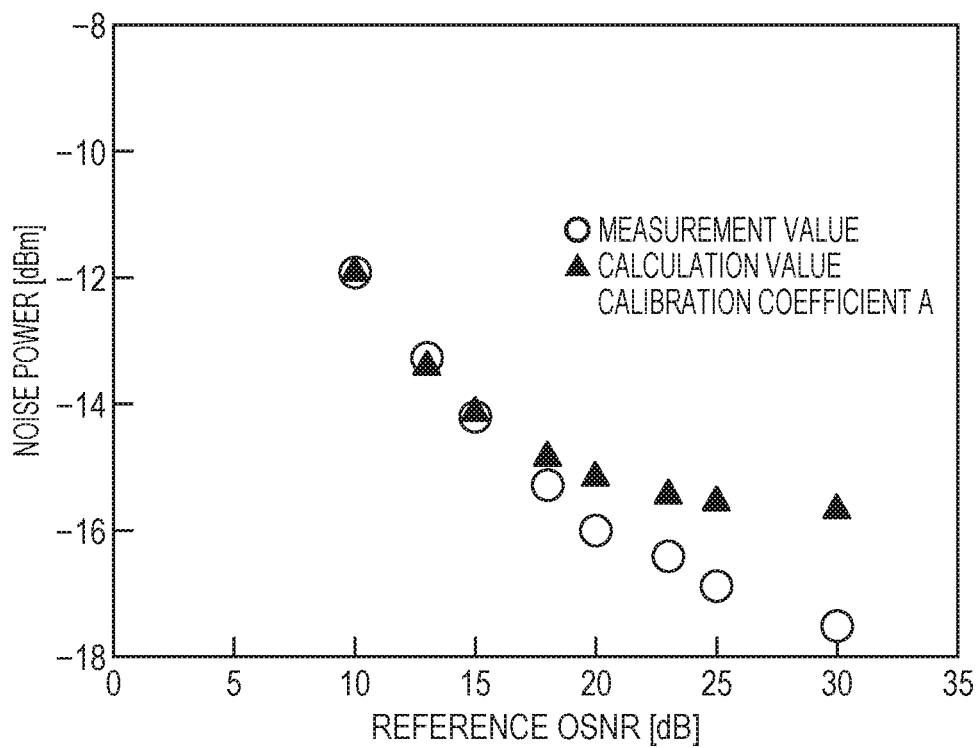

FIGS. 2A to 2B are a diagram and a graph illustrating determination of the constant A. For example, an OSNR monitoring controller 120 of FIG. 2A is configured to obtain and hold the constant A used in Expression (1). Specifically, the constant A with which a measurement value $N_{beat}$ dBm of the noise power and $N_{beat}$ calculated from Expression (1) in a noise power calculation unit 122 match with each other is determined in a noise power comparison determination unit 121. In other words, the constant A with which the monitor OSNR and the reference OSNR match with each other is output. In terms of causing the monitor OSNR and the reference OSNR to match with each other, the constant A may be referred to as the "calibration coefficient A" and the determining of the constant A may be referred to as fitting of the calibration coefficient A. The calibration coefficient A is held in a calibration coefficient A holding unit 123 and is read out and used when actual OSNR monitoring is performed, and thus, the accuracy of OSNR monitoring is increased.

FIG. 2B is a graph illustrating fitting of the calibration coefficient A based on Expression (1). A circle denotes a measurement value of the noise power, and a triangle denotes a noise calculation value calculated using the reference OSNR and the calibration coefficient A obtained by the fitting. In this example, very good fitting is observed in a range in which the OSNR is 10 dB to 20 dB but, in a range in which the OSNR is more than 20 dB, the measured noise power and the noise power calculated from Expression (1) are separated. Since there is a correlation between the noise power and the OSNR, the inventors have conceived that the OSNR may be highly accurately calculated by setting another calibration coefficient A in the area in which the OSNR is more than 20 dB and holding the calibration coefficient A.

In a general optical transmission apparatus, an optical spectrum analyzer is not used, and OSNR measurement using an OSNR monitor is performed. This is because, when the optical spectrum analyzer which is capable of highly accurately measuring an optical noise level included in an optical signal is used, the cost is high and the size of the apparatus is increased. In the case where the OSNR monitor is used, when an OSNR is measured for each of all of combinations of the optical signal power $P_{sig}$ and the noise power $N_{beat}$, and an expression representing the relationship among $P_{sig}$, $N_{beat}$, and the OSNR and the calibration coefficient A are calculated, the number of measurement steps, that is, the cost, is increased. In contrast, in view of FIG. 2B, an OSNR monitoring range is divided into a plurality of areas and an optimal calibration coefficient for each area is used, and thus, the OSNR may be highly accurately calculated in a wide OSNR monitoring range in a simple manner. This is the basis for each embodiment.

Figure 3:
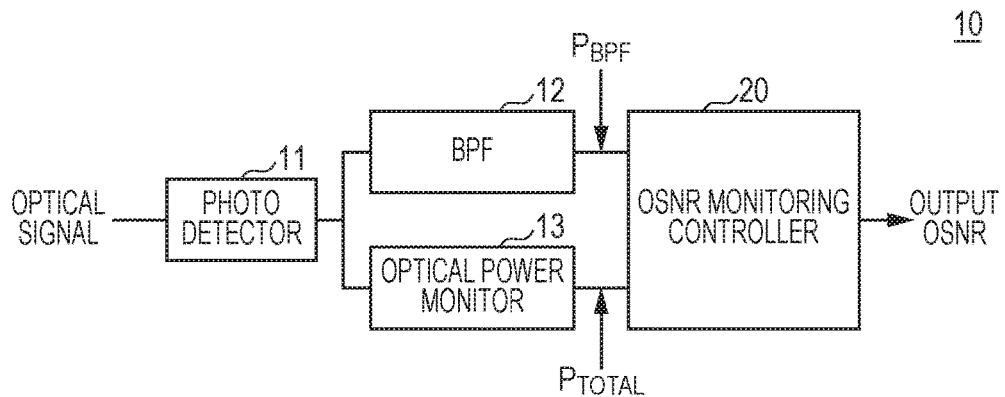
FIG. 3 is a schematic block diagram of an OSNR monitoring apparatus to which an embodiment is applied.

FIG. 3 is a schematic block diagram of an OSNR monitoring apparatus 10 according to an embodiment. The OSNR monitoring apparatus 10 includes a photodetector 11, a bandpass filter (BPF) 12, an optical power monitor 13, and an OSNR monitoring controller 20. The photodetector 11 converts received an optical signal to an electric current. The output electric current is caused to branch out into two paths and is thus input to the BPF 12 and the optical power monitor 13. Although a detailed configuration of the BPF 12 is not illustrated, for example, the BPF 12 imposes a band restriction on an input electric signal by a low pass filter (LPF) to remove a direct-current component, and outputs an alternating-current component (noise power). The output of the BPF 12 is referred to as the "BPF passing power" or "$P_{BPF}$". The operation unit 13 outputs power of a signal detected by the photodetector 11. This power value is referred to as "$P_{TOTAL}$". For the sake of simplifying the description, a signal obtained by removing an alternating-current component from $P_{TOTAL}$ is a desired signal power "$P_{DC}$".

The OSNR monitoring controller 20 calculates an OSNR from $P_{BPF}$ and $P_{DC}$ that have been input, using Expression (2).

$$P_{BPF} = C_{noise} + C_{BPF}\left(\frac{P_{DC}}{C_{LPF}\cdot\left(1+\frac{\gamma}{OSNR}\right)}\right)^2\left(\frac{1}{OSNR} + \frac{\gamma}{2\cdot OSNR^2}\right) \quad (2)$$

In Expression (2), $C_{noise}$ is certain background noise other than ASE, $C_{BPF}$ is a calibration coefficient used when the BPF passing power is calculated, $C_{LPF}$ is calibration coefficient used in the operation unit 13, and γ is a constant. Expression (2) includes the four calibration coefficients ($C_{noise}$, $C_{BPF}$, $C_{LPF}$, and γ). The OSNR monitoring controller 20 holds a plurality of calibration coefficients sets. How the calibration coefficient sets were calculated will be described later.

Figure 4:
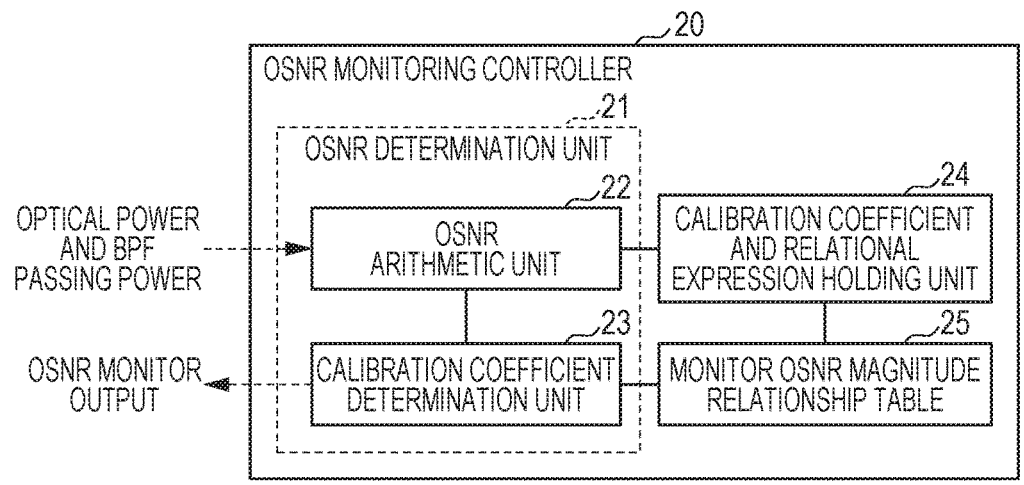
FIG. 4 is a schematic block diagram of an OSNR monitoring controller of the OSNR monitoring apparatus of FIG. 3.

FIG. 4 illustrates a configuration example of the OSNR monitoring controller 20. The OSNR monitoring controller 20 includes an OSNR determination unit 21, a calibration coefficient and relational expression holding unit 24, a monitor OSNR magnitude relationship table 25 (which will be hereinafter referred to as the "magnitude relationship table 25"). The OSNR determination unit 21 includes an OSNR arithmetic unit 22 and a calibration coefficient determination unit 23. The OSNR arithmetic unit 22 calculates a plurality of OSNRs, based on the optical power $P_{TOTAL}$ and the noise power $P_{BPF}$, using the relational expression and the plurality of calibration coefficient sets held in the calibration coefficient and relational expression holding unit 24. With reference to the magnitude relationship table 25, the OSNR value calibration coefficient determination unit 23 compares the magnitudes of the plurality of OSNRs and outputs an OSNR calculated using optimal calibration coefficient sets.

The optimal calibration coefficient set herein is a calibration coefficient set which causes a difference between an actual OSNR (the reference OSNR) and a calculated monitor OSNR to be the smallest. In other words, a calibration coefficient set which causes a difference between a measurement value of $P_{BPF}$ which has passed through the BPF 12 and a calculation value $P_{BPF\_cal}$ of passing power of the BPF 12, which is calculated from Expression (2) using a known OSNR, to be the smallest.

The magnitude relationship among OSNRs calculated using a plurality of calibration coefficients for each of the areas, into which the OSNR monitoring range is divided, and an OSNR that is to be selected for the corresponding area are held in the magnitude relationship table 25.

Figure 5:
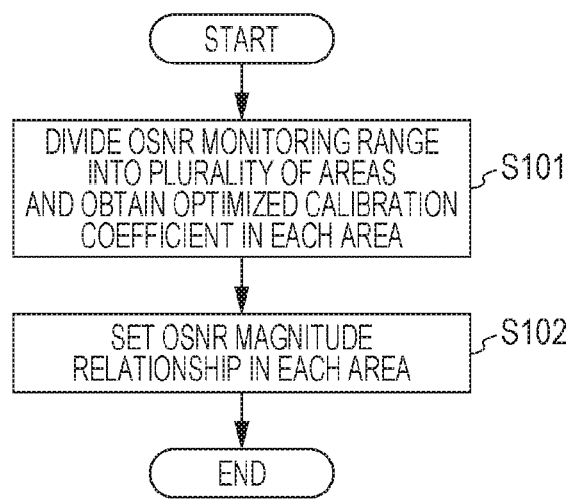
FIG. 5 is a flow chart of processing of obtaining a plurality of calibration coefficient sets and an OSNR magnitude relationship in each area.

FIG. 5 is a flow chart illustrating processing of setting the plurality of calibration coefficient sets and the magnitude relationship table 25. The OSNR monitoring range is divided into a plurality of areas and a calibration coefficient set which causes a difference between $P_{BPF}$ and $P_{BPF\_cal}$ (or a difference between the reference OSNR and the monitor OSNR) to be the smallest in each area is calculated (S101). Next, in each area, the magnitude relationship among a plurality of OSNR values (for example, $OSNR_A$, $OSNR_B$, and $OSNR_C$) calculated using the plurality of calibration coefficient sets is calculated and the magnitude relationship table 25 is set (S102). Details of each operation will be described later.

FIGS. 6A to 6C and FIGS. 7A to 7C illustrate examples of the magnitude relationship table 25. The magnitude relationship table illustrated in FIG. 6C has been optimized such that the smallest OSNR among the OSNR values ($OSNR_A$, $OSNR_B$, and $OSNR_C$) calculated using a plurality of calibration coefficient sets A, B, and C is selected and output. The magnitude relationship table illustrated in FIG. 7C has been optimized such that the largest OSNR among the OSNR values ($OSNR_A$, $OSNR_B$, and $OSNR_C$) calculated using the plurality of calibration coefficient sets A, B, and C is selected and output.

FIG. 6A illustrates the relationship between the OSNR monitoring range divided into a plurality of areas I, II, and III and the BPF passing power value ($P_{BPF}$) calculated from Expression (2) using the plurality of calibration coefficient sets. The dashed line indicates the measurement value of the BPF passing power. In the area I, the BPF passing power value calculated using the calibration coefficient set A fits the measurement value the most. In the area II, the BPF passing power value calculated using the calibration coefficient set B fits the measurement value the most. In the area III, the BPF passing power value calculated using the coefficient set C fits the measurement value the most.

FIG. 6B is a graph in which the relationship of FIG. 6A is replaced with the relationship between the reference OSNR and the monitor OSNR. The dashed line in FIG. 6B is a line at which the reference OSNR and the monitor OSNR match each other. Similar to FIG. 6A, in the area I, the monitor $OSNR_A$ calculated using the calibration coefficient set A is the closest to the reference OSNR, in the area II, the monitor $OSNR_B$ calculated using the calibration coefficient B is the closest to the reference OSNR, and, in the area III, the monitor $OSNR_C$ calculated using the calibration coefficient set C is the closest to the reference OSNR.

When the plurality of OSNR values are compared for each area, in the area I, the monitor $OSNR_A$ calculated using the calibration coefficient set A is the smallest, and the monitor $OSNR_B$ calculated using the calibration coefficient set B is the second smallest. In the first half of the area II (in which the OSNR value is smaller), the monitor $OSNR_B$ is the smallest, and the monitor $OSNR_A$ is the second smallest. In the latter half of the area II (in which the OSNR value is larger), the monitor $OSNR_B$ is the smallest and the monitor $OSNR_C$ calculated using the calibration coefficient set C is the second smallest. In each of all of the areas, the smallest OSNR value fits the measurement value the most.

FIG. 6C illustrates the magnitude relationship table 25 in which the magnitude relationship among the monitor OSNR values described above is described. The magnitude relationship table 25 has been optimized such that the smallest OSNR (indicated by boldface) among the plurality of monitor OSNRs is selected as an optimal OSNR value at all times, regardless of the divided areas. In this case, the calibration coefficient determination unit 23 of the OSNR monitoring controller 20 determines the magnitude relationship among the plurality of OSNR values (for example, three OSNR values) calculated by the OSNR arithmetic unit 22, finds a matching magnitude relationship in the magnitude relationship table 25, and outputs an OSNR designated as a selected OSNR. Also, a calibration coefficient set that gives a selected OSNR value is selected.

In FIG. 7A, in the area I, the BPF passing power value calculated using the calibration coefficient set A fits the measurement value indicated by the dashed line the most, in the area II, the BPF passing power value calculated using the calibration coefficient set B fits the measurement value the most, and, in the area III, the BPF passing power value calculated using the calibration coefficient set C fits the measurement value the most.

FIG. 7B is a graph in which the relationship of FIG. 7A is replaced with the relationship between the reference OSNR and the monitor OSNR. The dashed line in FIG. 7B indicates an actual measurement value of the reference OSNR. Similar to FIG. 7A, in the area I, the monitor $OSNR_A$ calculated using the calibration coefficient set A fits the reference OSNR the most, in the area II, the monitor $OSNR_B$ calculated using the calibration coefficient B fits the reference OSNR the most, and, in the area III, the monitor $OSNR_C$ calculated using the calibration coefficient set C fits the reference OSNR the most. Unlike FIG. 6B, the largest OSNR value in each area fits the measurement value the most.

FIG. 7C illustrates the magnitude relationship table 25 in which the magnitude relationship among the monitor OSNR values of FIG. 7B is described. In this example, the magnitude relationship table 25 has been optimized such that the largest OSNR among the plurality of monitor OSNRs is selected at all times, regardless of the divided areas. In this case, the calibration coefficient determination unit 23 of the OSNR monitoring controller 20 determines the magnitude relationship among the plurality of OSNR values (for example, three OSNR values) that have been calculated, specifies a matching magnitude relationship in the magnitude relationship table 25, and determines an OSNR value designated to be selected. The determined OSNR is output as a monitor result and a calibration coefficient set that gives the OSNR is selected.

The OSNR monitoring controller 20 including the magnitude relationship table 25 of FIG. 6C or FIG. 7C may perform calculation of a plurality of monitor OSNRs and selection of an optimal OSNR at a predetermined timing, not every time. In that case, the OSNR arithmetic unit 22 may be configured to calculate one OSNR from Expression (2) using a selected calibration coefficient set to output a monitor OSNR until a timing of next calibration coefficient determination. The predetermined timing may be a certain time interval, and may be a time when at least one of $P_{DC}$ and $P_{BPF}$ changes to be more than a predetermined value.

When the relationship between $P_{DC}$ and $P_{BPF}$ changes, the OSNR changes, but the magnitude relationship between OSNRs calculated using a plurality of calibration coefficient sets does not change. In this embodiment, regardless of changes of $P_{DC}$ and $P_{BPF}$, a correct OSNR value and a calibration coefficient at that time may be determined only from the magnitude relationship between calculated OSNR values.

Figure 8:
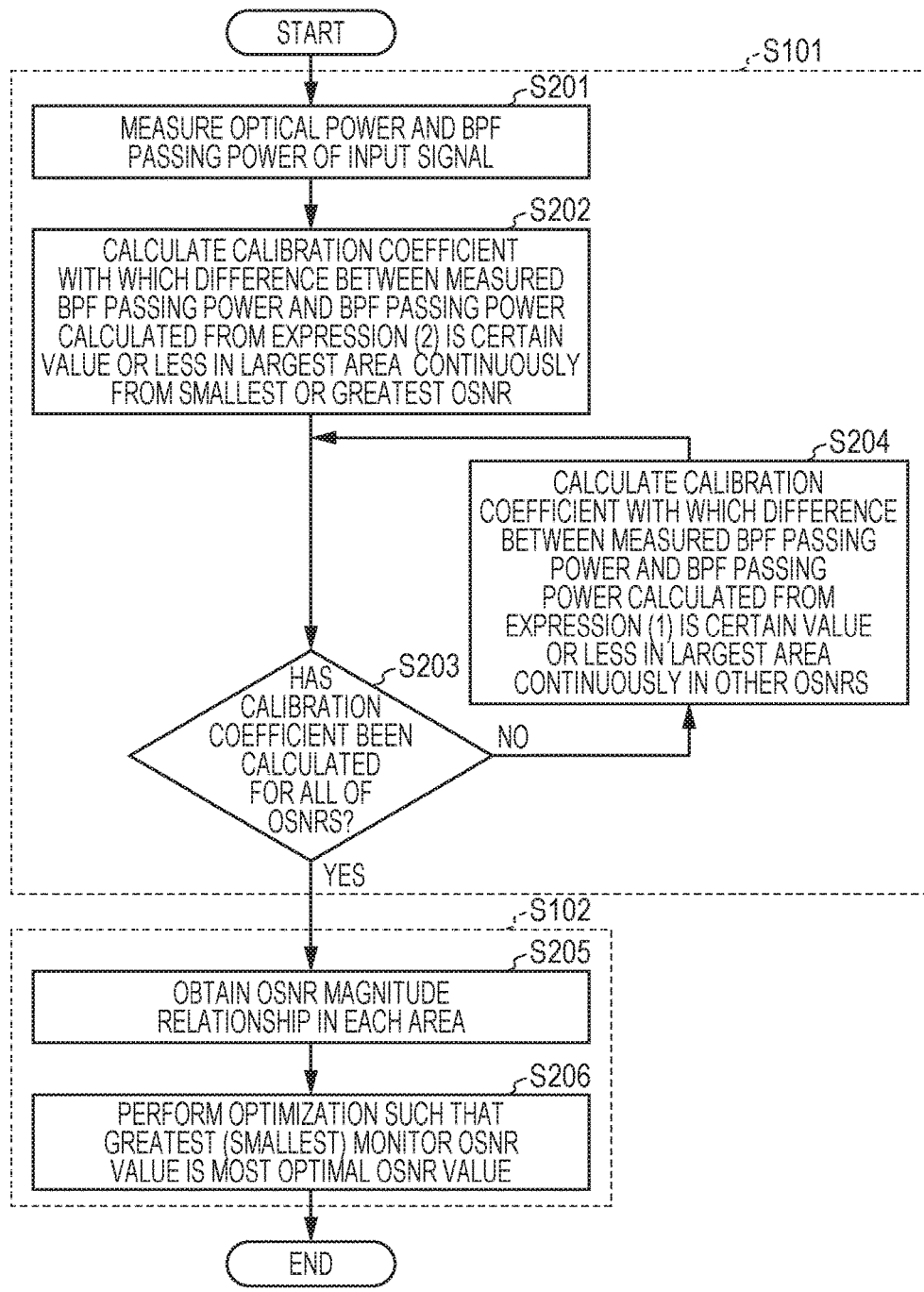
FIG. 8 is a flow chart of processing of obtaining a magnitude relationship table illustrated in FIG. 6C or FIG. 7C.

FIG. 8 is a flow chart illustrating area setting and magnitude relationship setting performed prior to an operation of the OSNR monitoring apparatus 10. In FIG. 8, S201 to S204 indicate details of an operation S101 of FIG. 5 and S205 and S206 indicate details of an operation S102. First, the reference OSNR is changed in an OSNR measuring range determined in advance and the optical power $P_{TOTAL}$ and the BPF passing power $P_{BPF}$ of an input signal are measured (S201). Next, an area in which a difference between a measurement value of the BPF passing power and a calculation value of $P_{BPF}$ obtained based on Expression (2) is in a range of a predetermined value is specified continuously from the smallest or largest OSNR, and a calibration coefficient set at that time is calculated (S202).

For example, in FIG. 6A, an area in which a difference between a measurement value and a calculation value of the BPF passing power is maintained to be in a range of a predetermined value or less continuously from the smallest OSNR is the area I. A point at which the difference between the measurement value of the BPF passing power and the calculation value goes over the predetermined value is assumed to be an end point of the area I and a calibration coefficient set which causes the measurement value and the calculation value to fit each other the most is calculated. As for Expression (2), for example, a calibration coefficient set ($C_{noise}$, $C_{BPF}$, $C_{LPF}$, and $\gamma$) may be determined using a least-square method. The calibration coefficient set determined here is the calibration coefficient set A in the example of FIGS. 6A to 6C.

Next, it is determined whether or not a calibration coefficient has been calculated in the entire OSNR range (S203). If there is an area in which a calibration coefficient set is not determined (NO in S203), the process returns to S202, and an area in which the difference between the measurement value of the BPF passing power and the calculation value is maintained to be in a range of the predetermined value or less continuously in the other OSNRs, that is, from the end point of the area I, is specified. Then, a calibration coefficient set in the specified area is detrained (S204). In the example of FIGS. 6A to 6C, a point at which the difference between the calculation value and the measurement value of the BPF passing power goes over the predetermined value is assumed to be an end point of the area II and a calibration coefficient set of the area II is calculated from Expression (2). The calibration coefficient set calculated here is the calibration coefficient set B.

S203 and S204 are repeated until areas are specified and calibration coefficient sets are determined in the entire OSNR range. In the example of FIGS. 6A to 6C, the difference between the measurement value and the calculation value of the BPF passing power is in a range of the predetermined value or less continuously from the end point of the area II to a maximum value of the OSNR range, and the area III is specified. The calibration coefficient set C of the area III is calculated from Expression (2).

When the areas are specified and the calibration coefficient sets are determined in the entire OSNR range (YES in S203), the OSNR magnitude relationship in each area is obtained (S205). At the end of S203, only one optimal calibration coefficient set is calculated for each area. If the monitor OSNR is calculated for the other areas using the calibration coefficient set A calculated in the area I, the $OSNR_A$ (an OSNR calculated using the calibration coefficient set A) indicated by the solid line of FIG. 6B is calculated. If the monitor OSNR is calculated for the other areas using the calibration coefficient set B calculated in the area II, the $OSNR_B$ (an OSNR calculated using the calibration coefficient set B) indicated by the alternate long and two short dashed line of FIG. 6B is calculated. If the monitor OSNR is calculated for the other areas using the calibration coefficient set C calculated in the area III, the $OSNR_C$ (an OSNR calculated using the calibration coefficient set C) indicated by the alternate long and short dashed line of FIG. 6B is calculated. Thus, the magnitude relationship among the $OSNR_A$, the $OSNR_B$, and the $OSNR_C$ in each of the areas I, II, and III is calculated.

Next, in each area, it is confirmed that the smallest monitor OSNR (in FIG. 6B) or the largest monitor OSNR (FIG. 7B) is the closest to the actual OSNR (S206), and the process ends.

In the examples of FIGS. 6A to 6C and FIGS. 7A to 7C, the OSNR measuring range is divided into three areas, but may be divided into three or more areas. If the difference between the measurement value and the calculation value of the BF passing power is in a range of the predetermined value or less continuously in a wide range, the OSNR measuring range may be divided into two areas. If the difference between the measurement value and the calculation value of the BF passing power is more than a predetermined value in a narrow range, the OSNR measuring range may be divided into four (or more).

FIGS. 9A to 9C illustrate an example in which area information is added to the magnitude relationship table 25. In FIG. 6C and FIG. 7C, the magnitude relationship table 25 is set such that the smallest or largest monitor OSNR in each area is an optimal OSNR. In this case, the OSNR monitoring apparatus 10 in operation outputs, as the OSNR monitor value, the smallest (or largest) OSNR value among a plurality of OSNRs calculated using a plurality of calibration coefficient sets, and selects a calibration coefficient set linked to the OSNR value.

However, there may be cases where the smallest or largest monitor OSNR does not fit the actual OSNR the most at all times in the entire OSNR range. Thus, as illustrated in FIG. 9C, area information is added to the magnitude relationship table.

As illustrated in FIG. 9A, it is when the calibration coefficient set A is used that the calculation value and the measurement value of the BPF passing power fit each other the most in the area I. As illustrated in FIG. 9B, the monitor OSNR calculated using the calibration coefficient set A is intermediate in terms of magnitude among the three monitor OSNRs in the area I. In the area II, the monitor OSNR calculated using the calibration coefficient set B is the closest to the reference OSNR, and is the smallest among the three monitor OSNRs. In the area III, the monitor OSNR calculated using the calibration coefficient set C is the closest to the reference OSNR, but is intermediate in terms of magnitude among the three calculated OSNRs. In the areas II and III, the smallest monitor OSNR is an optical monitor value, but this does not apply to the area I.

As described above, if the order of the magnitudes of the monitor OSNRs that fit the actual OSNR the most varies among areas, area information is added to the magnitude relationship table 25 and an optical monitor OSNR is selected for each area. The OSNR monitoring apparatus 10 itself does not know in which area the currently calculated monitor OSNR is given, and therefore, the area is determined with reference to the magnitude relationship table 25.

In the example of FIG. 9C, the $OSNR_B$ calculated using the calibration coefficient set B is compared to a first threshold $OSNR_x$ and a second threshold $OSNR_y$, and thus, areas are specified. The reason why the $OSNR_B$ is used in area determination is that, in the example of FIGS. 9A to 9C, the $OSNR_B$ matches or is close to the reference OSNR at both of a boundary between the areas I and II and a boundary between the areas II and III. Threshold determination may be performed using another monitor OSNR.

During an operation of the OSNR monitoring apparatus 10, the OSNR determination unit 21 compares the monitor value $OSNR_B$ calculated using the calibration coefficient set B to the first threshold $OSNR_x$ and the second threshold $OSNR_y$, and area determination is performed with reference to the magnitude relationship table 25. If the $OSNR_B$ is smaller than the first $OSNR_x$, it is determined that area determination is to be performed in accordance with the magnitude relationship of the area I, and the intermediate OSNR in terms of magnitude among the three monitor OSNRs calculated using the three calibration coefficient sets A, B, and C is output. If the $OSNR_B$ is the first threshold $OSNR_x$ or more and the second threshold OSNR or less, it is determined that area determination is to be performed in accordance with the magnitude relationship of the area II, and the smallest monitor OSNR among the three monitor OSNRs is output. If the $OSNR_B$ is larger than the second threshold $OSNR_y$, it is determined that area determination is to be performed in accordance with the magnitude relationship of the area III, and the intermediate monitor OSNR among the three monitor OSNRs is output.

The magnitude relationship among OSNRs calculated using a plurality of calibration coefficient sets does not change even when $P_{DC}$ and $P_{BPF}$ change, and therefore, an optimal OSNR may be stably output. Also, the number of steps of preparing an optimal calibration coefficient set for each of all of combinations of $P_{DC}$ and $P_{BPF}$ may be reduced.

FIG. 10 is a flow chart of area setting and magnitude relationship setting of FIGS. 9A to 9C. Each operation that is the same as the corresponding one of FIG. 8 is denoted by the same reference character and a duplicate description is omitted or simplified. Similar to FIG. 8, an area in which a difference between a measurement value and a calculation value of the BPF passing power is continuously in a range of a predetermined value or less is sequentially specified and an optimal calibration coefficient set in each area is calculated (S201 to S204). OSNRs are calculated for the other areas using the calculated calibration coefficient set, and the OSNR magnitude relationship is calculated (S205). Whether or not the smallest or largest monitor OSNR is an optimal OSNR in the entire OSNR range is checked (S301). A case where the smallest OSNR among the plurality of calculated OSNRs is an optimal OSNR is a pattern of FIGS. 6A to 6C. A case where the largest OSNR among the plurality of calculated OSNRs is an optimal OSNR is a pattern of FIGS. 7A to 7C.

If optimization is not performed such that the smallest or largest monitor OSNR among the plurality of monitor OSNRs is selected (NO in S301), area information is obtained (S302). For example, a point at which a calibration coefficient set which gives a monitor OSNR that fits the actual OSNR the most is changed is assumed to be an area boundary, and area information illustrated in FIG. 9C in which an OSNR value at an area boundary is a threshold is held in the magnitude relationship table 25.

Figure 11:
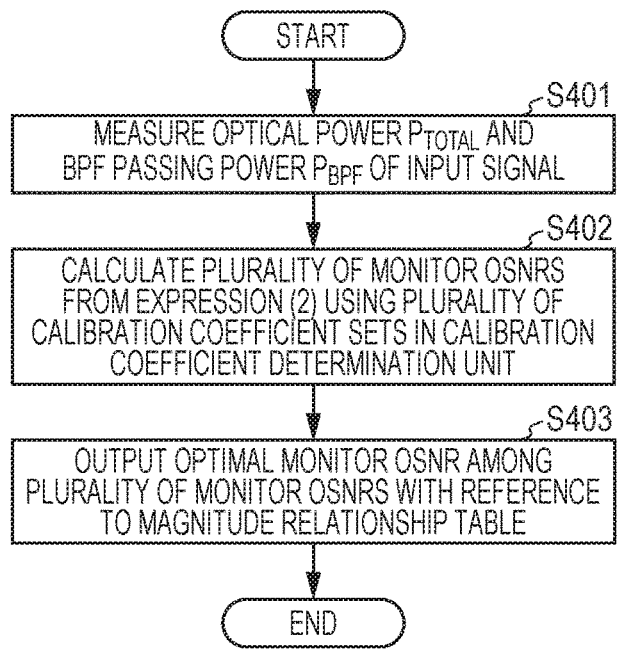
FIG. 11 is a flow chart illustrating an OSNR monitoring method according to the embodiment.

FIG. 11 is a flow chart of an OSNR monitoring method according to the embodiment. The flow of FIG. 11 is processing performed during an operation of the OSNR monitoring apparatus 10. In the OSNR monitoring controller 20, an optical power $P_{TOTAL}$ and a noise power $P_{BPF}$ (the BPF passing power) of an input signal are measured (S401). A plurality of monitor OSNRs is calculated from Expression (2), using $P_{TOTAL}$ and $B_{BPF}$, which have been measured, and a plurality of calibration coefficient sets, which have been held in advance (S402). With reference to the magnitude relationship table 25, an optimal OSNR among the plurality of monitor OSNRs is output (S403). Which one of the magnitude relationships held in the magnitude relationship table 25 the magnitude relationship among the plurality of monitor OSNRs, which have been calculated, matches is determined, and thus, which monitor OSNR is to be selected and be output is determined.

Figure 12:
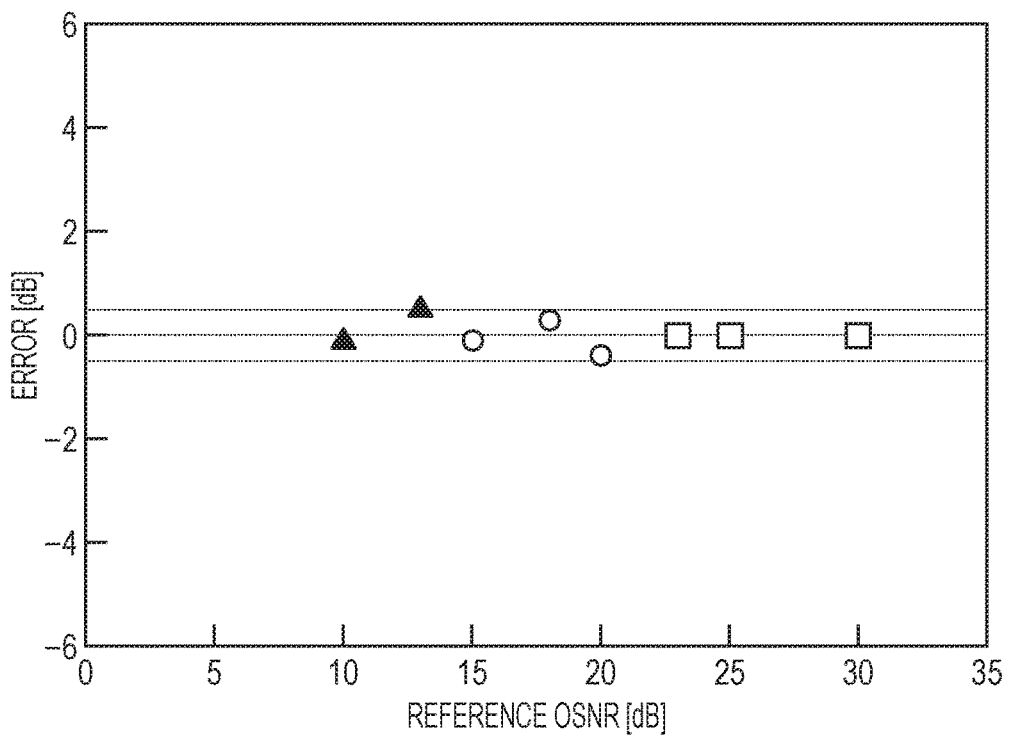
FIG. 12 is a graph illustrating advantages of OSNR monitoring according to the embodiment.

FIG. 12 is a graph illustrating advantages of the embodiment. A monitor error may be reduced to an allowable range by optimally selecting a plurality of calibration coefficient sets. For example, in an area in which the OSNR is smaller than 15 dB, the OSNR calculated using the calibration coefficient set A is output as a monitor result. A monitor error in this case is indicated by a triangle. In an area in which the OSNR is 15 dB or more and 20 dB or less, the OSNR calculated using the calibration coefficient set B is output as a monitor result. A monitor error in this case is indicated by a circle. In an area in which the OSNR is more than 20 dB and 30 dB or less, the OSNR calculated using the calibration coefficient set C is output as a monitor result. A monitor error in this case is indicated by a square. In each of the above-described cases, errors are in an allowable range. An OSNR that is to be output, among the plurality of OSNR calculation values, is determined in a simple manner by determining the magnitude relationship with reference to the magnitude relationship table. Thus, an OSNR monitor result may be highly accurately output in a wide range.

In the above-described embodiment, the four constants used in Expression (2) are a calibration coefficient set, but constants A of a plurality of values may be prepared for each divided area in advance, the magnitude relationship among OSNRs calculated using the constants A of a plurality of values may be determined, and an optical OSNR may be output.

Figure 13:
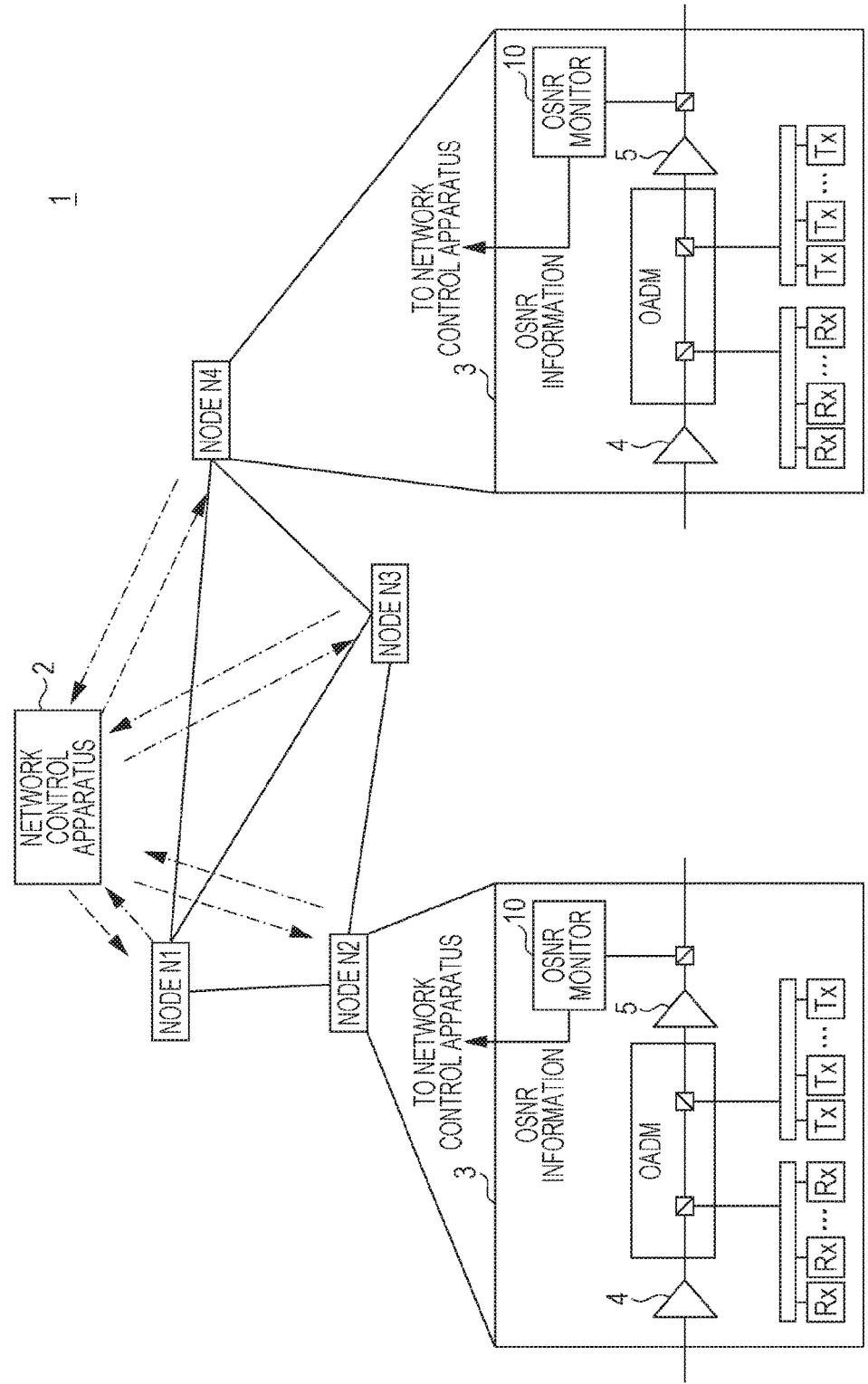
FIG. 13 is a diagram illustrating an example of an optical repeater to which the OSNR monitoring apparatus according to the embodiment is applied.

FIG. 13 is a schematic diagram of an optical repeater 3 using the OSNR monitoring apparatus 10 according to the embodiment and an optical network 1 to which the optical repeater 3 is applied. The optical repeater 3 is used as a node (NODE N1 to NODE N4) of the optical network 1.

Communication from NODE N1 to NODE N4 will be considered. For example, in the optical repeater 3 of NODE N2, an optical signal received from a transmission path is amplified by an optical amplifier (preamplifier) 4, and an optical signal output to a transmission path is amplified by an optical amplifier (postamplifier) 5. When an optical signal is amplified, spontaneous emission light is generated, and amplified spontaneous emission light (ASE) is superimposed as noise on the optical signal. The OSNR monitoring apparatus 10 includes the configurations illustrated in FIG. 3 and FIG. 4, measures OSNRs, and supplies obtained monitor information to a network control apparatus 2. In the network control apparatus 2, OSNR monitor information is collected from each of NODE N1 to NODE N4. Note that ODMA is an abbreviation of optical add drop multiplexer.

Figure 14:
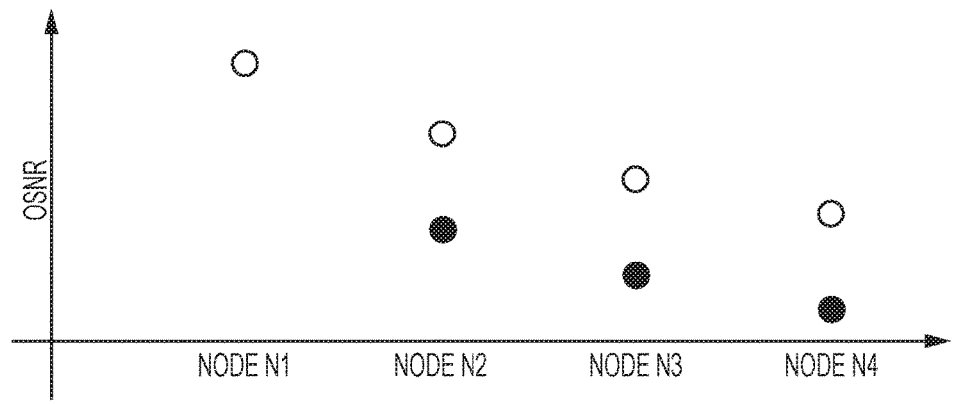
FIG. 14 is a diagram illustrating an example of use of an OSNR monitor result.

FIG. 14 illustrates an example of OSNR monitor information collected in the network control apparatus 2. White circles indicate monitor results collected from NODE N1 to NODE N4 during a normal operation. When a failure occurs in the optical network 1 and OSNR deterioration occurs at NODEs N2, N3, and N4, a monitor result indicated by a black circle is obtained, and an alarm is raised in the network control apparatus 2. The network control apparatus 2 specifies, based on the collected monitor results, that a failure has occurred at NODE N2, and failure recovery is performed.

The OSNR monitoring apparatus 10 may be provided in each channel selected by the corresponding OADM to measure an OSNR for each wavelength. The OSNR monitoring apparatus 10 outputs the most optimal OSNR monitor value, based on the magnitude relationship among the plurality of OSNRs calculated using the plurality of calibration coefficients, and thus, optical signal quality may be highly accurately measured in each channel.

Figure 15:
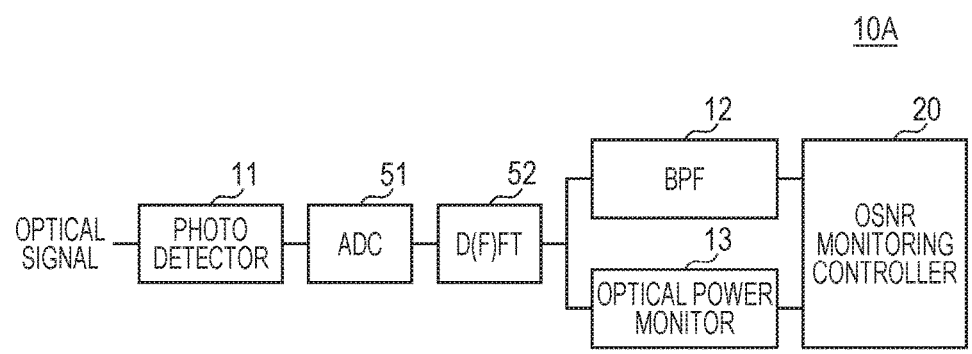
FIG. 15 is a diagram illustrating a first modified example of the OSNR monitoring apparatus.

FIG. 15 illustrates an OSNR monitoring apparatus 10A as a first modified example of the OSNR monitoring apparatus 10 according to the embodiment. In the OSNR monitoring apparatus 10A, an analog electric signal detected by the photodetector 11 is converted to a digital signal by an analog-digital converter 51 and discrete (high-speed) Fourier transform is performed by a D(F)FT 52. An output of the D(F)FT 52 is supplied to the BPF 12 and the operation unit 13, and the OSNR monitoring controller 20 outputs an OSNR, based on the noise power from the BPF 12 and the optical power from the operation unit 13.

Figure 16:
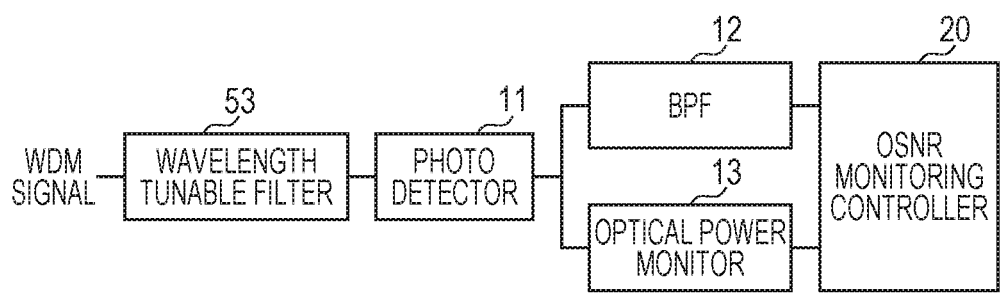
FIG. 16 is a diagram illustrating a second modified example of the OSNR monitoring apparatus.

FIG. 16 illustrates an OSNR monitoring apparatus 10B as a second example of the OSNR monitoring apparatus 10 according to the embodiment. In the OSNR monitoring apparatus 10B, light of a wavelength selected by a wavelength tunable filter 53 is detected from a WDM signal by the photodetector 11. An electric signal output from the photodetector 11 is supplied to the BPF 12 and the operation unit 13, and the OSNR monitoring controller 20 outputs an OSNR of the selected wavelength (channel) using outputs of the BPF 12 and the operation unit 13.

Figure 17:
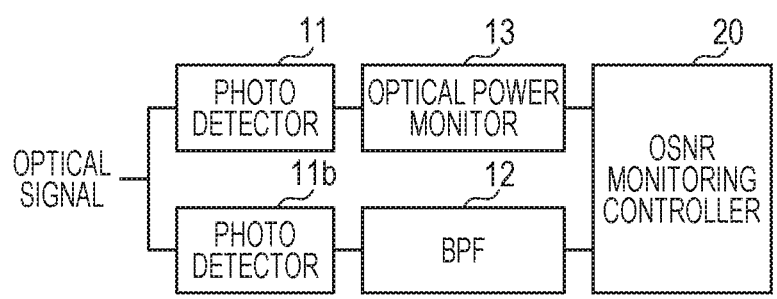
FIG. 17 is a diagram illustrating a third modified example of the OSNR monitoring apparatus.

FIG. 17 illustrates an OSNR monitoring apparatus 10C as a third modified example of the OSNR monitoring apparatus 10 according to the embodiment. In the OSNR monitoring apparatus 10C, an optical signal is caused to branch out into two optical paths by an optical branching unit (not illustrated), such as an optical coupler, and the like, and is guided to photo detectors 11a and 11b. Power of an electric signal output from the photodetector 11a is measured by the operation unit 13, and an optical power measurement value is input to the OSNR monitoring controller 20. An electric signal output from the photodetector 11b passes through the BPF 12, and a bandpass alternating-current power is input to the OSNR monitoring controller 20. The OSNR monitoring controller 20 calculates an OSNR, based on the optical power measurement value and the bandpass alternating-current power, and outputs the OSNR.

In any of the configurations of FIG. 15 to FIG. 17, the OSNR monitoring controller 20 calculates a plurality of OSNRs from power of an optical signal and power of a noise component included in the optical signal using a plurality of calibration coefficients (or calibration coefficient sets), and outputs one optical OSNR, based on the magnitude relationship among the plurality of OSNRs. Thus, OSNRs may be highly accurately monitored in a wide range. Also, the magnitude relationship among OSNRs calculated using a plurality of calibration coefficients does not change even when desired signal intensity and noise intensity change, and therefore, stable measurement may be performed in simple manner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical signal quality monitoring apparatus comprising:
a bandpass filter configured to perform a filtering operation to thereby output a noise power of light input to the optical signal quality monitoring apparatus;
an optical power monitor configured to measure an optical power of the light input to the optical signal quality monitoring apparatus; and
an optical signal-to-noise ratio (OSNR) controller configured to
calculate a plurality of optical signal-to-noise ratios, based on the optical power measured by the optical power monitor and the noise power output by the bandpass filter, by using a relational expression and a plurality of calibration coefficients used in the relational expression, wherein the relational expression represents a relationship among an optical signal intensity, a noise intensity, and an optical signal-to-noise ratio,
select one optical signal-to-noise ratio from the plurality of optical signal-to-noise ratios, based on a magnitude relationship of the plurality of optical signal-to-noise ratios, and
output the selected optical signal-to-noise ratio as the optical signal-to-noise ratio of the light input to the optical signal quality monitoring apparatus.

2. The optical signal quality monitoring apparatus according to claim 1, wherein
a range for measuring the optical power of the light input to the optical signal quality monitoring apparatus and the noise power in the light input to the optical signal quality monitoring apparatus is divided into a plurality of areas, and
the OSNR controller is further configured to
calculate the magnitude relationship of the plurality of optical signal-to-noise ratios for each of the plurality of areas,
store the calculated magnitude relationship of the plurality of optical signal-to-noise ratios for each of the plurality of areas in a table, and
select the one optical signal-to-noise ratio with reference to the table.

3. The optical signal quality monitoring apparatus according to claim 2, wherein the OSNR controller is further configured to:
optimize the plurality of calibration coefficients so that differences between reference optical signal-to-noise ratios and the calculated plurality of optical signal-to-noise ratios in the plurality of areas are minimized.

4. The optical signal quality monitoring apparatus according to claim 2, wherein the OSNR controller is further configured to:
optimize the table such that the OSNR controller selects, in a respective area of the plurality of areas, a smallest or largest optical signal-to-noise ratio among the plurality of optical signal-to-noise ratios in the respective area as the one optical signal-to-noise ratio.

5. The optical signal quality monitoring apparatus according to claim 2,
wherein the table includes area information to specify the plurality of areas, and
wherein the OSNR controller selects the one optical signal-to-noise ratio, based on the area information and the magnitude relationship of the plurality of optical signal-to-noise ratios for each of the plurality of areas stored in the table.

6. The optical signal quality monitoring apparatus according to claim 1, wherein the optical signal quality monitoring apparatus is included in a node of an optical network.

7. The optical signal quality monitoring apparatus according to claim 6, wherein the node is an optical repeater.

8. The optical signal quality monitoring apparatus according to claim 6, wherein the selected optical signal-to-noise-ratio output by the OSNR controller is transmitted by the node to a network control apparatus.

9. An optical signal quality monitoring method to calculate an optical signal-to-noise ratio of input light, the method comprising:
storing a relational expression representing a relationship among an optical signal intensity, a noise intensity, and an optical signal-to-noise ratio, and a plurality of calibration coefficients used in the relational expression;
performing, by a bandpass filter, a filtering operation to thereby output a noise power of the input light;
measuring, by an optical power monitor, an optical power of input light;
calculating, by an optical signal-to-noise ratio (OSNR) controller, a plurality of optical signal-to-noise ratios, based on the optical power measured by the optical power monitor and the noise power output by the bandpass filter, by using the stored relational expression and the stored plurality of calibration coefficients;
selecting, by the OSNR controller, one optical signal-to-noise ratio from the plurality of optical signal-to-noise ratios, based on a magnitude relationship of the plurality of optical signal-to-noise ratios; and
outputting, by the OSNR controller, the selected optical signal-to-noise ratio as the optical signal-to-noise ratio of the input light.

10. The optical signal quality monitoring method according to claim 9, wherein a range for measuring the optical power of the input light and the noise power in the input light is divided into a plurality of areas, and the method further comprising:
determining, by the OSNR controller, one calibration coefficient for each area of the plurality of areas, so as to obtain the plurality of calibration coefficients, and so that differences between reference optical signal-to-noise ratios and the calculated plurality of optical signal-to-noise ratios in the plurality of areas are minimized.

11. The optical signal quality monitoring method according to claim 10, further comprising:
calculating the magnitude relationship of the plurality of optical signal-to-noise ratios for each of the plurality of areas; and
storing, in a table, the calculated magnitude relationship of the plurality of optical signal-to-noise ratios for each area of the plurality of areas,
wherein the OSNR controller selects the one optical signal-to-noise ratio based on the table.

12. The optical signal quality monitoring method according to claim 9, wherein the bandpass filter, the optical power monitor and the OSNR controller are included in a node of an optical network, and the method further comprises:
transmitting, by the node, the selected optical signal-to-noise-ratio output by the OSNR controller to a network control apparatus.

13. The optical signal quality monitoring method according to claim 12, wherein the node is an optical repeater.

14. An optical signal quality monitoring apparatus comprising:
means for measuring an optical power of light input to the apparatus and a noise power in the light input to the apparatus;
means for calculating a plurality of optical signal-to-noise ratios, based on the measured optical power and the measured noise power, by using a relational expression and a plurality of calibration coefficients used in the relational expression, wherein the relational expression represents a relationship among an optical signal intensity, a noise intensity, and an optical signal-to-noise ratio;
means for selecting one optical signal-to-noise ratio from the plurality of optical signal-to-noise ratios, based on a magnitude relationship of the plurality of optical signal-to-noise ratios, and for outputting the selected optical signal-to-noise ratio as the optical signal-to-noise ratio of the light input to the apparatus.

* * * * *